Patented Nov. 30, 1948

2,455,255

UNITED STATES PATENT OFFICE 2,455,255

PROCESS OF PREPARING AN ANTIOXIDANT FROM RICE BRAN

Charles I. Jarowski, Springfield, Eric T. Stiller, Philadelphia, and Martin B. Williamson, Lansdowne, Pa., assignors to Wyeth Incorporated, Philadelphia, Pa., a corporation of Delaware No Drawing. Application August 24, 1946, Serial No. 692,928

6 Claims. (Cl. 252—398)

This invention relates to an antioxidant derived from natural sources. It relates particularly to an antioxidant derived from rice bran. Such an antioxidant finds industrial application in retarding oxidative deterioration in medicinals and foods, especially of the type containing an appreciable percentage of fats or oils.

This application discloses a modification of the invention disclosed in the co-pending application of Patterson and Williamson Serial No. 594,592, filed May 18, 1945, which in turn is an improvement over the invention disclosed in the co-pending application of Patterson and Williamson Serial No. 499,572, filed August 21, 1943, which has eventuated into Patent No. 2,380,546, dated July 31, 1945.

In the aforesaid patent, an essential feature of the invention involved extraction of antioxidant material from rice bran concentrate by the use of a halogenated hydrocarbon solvent. In the co-pending application, Serial No. 594,592, an essential feature of the invention involves methanol extraction of rice bran concentrate.

It is to be noted that both prior applications involved essentially a treatment of rice bran concentrate obtained by aqueous or alcoholic extraction of rice bran. The use of rice bran concentrate, while highly effective, results in a high cost product since the starting material is expensive and relatively difficult to procure. This invention not only starts with an easily procurable and inexpensive material, but results in obtaining a more potent antioxidant at lower cost.

In order to extract antioxidant material from oil-bearing natural sources, it has been proposed to treat oil-bearing material with certain alcohols, esters, aldehydes and ketones. The extract is then treated with alkali in order to remove excess free fatty acids and the liquid fraction may then be solvent-extracted with a fat solvent to obtain antioxidant material. The source of the antioxidant in this case is apparently derived from the oily and fatty fractions of the starting material.

We have found, on the other hand, a highly potent antioxidant in defatted rice bran which has the important characteristic of reacting in alkaline solution to form alkali or alkaline earth metal salts which are easily separated. From these salts we obtain a highly purified and potent antioxidant free of inert, ballast material, and which therefore is highly effective in small quantities as an antioxidant, particularly for foods and medicinal preparations and more particularly those comprising animal and vegetable fats and oils.

In carrying out the extraction of our antioxidant from rice bran, this material is first defatted substantially completely by the use of a defatting solvent such as petroleum ether, chloroform, diethyl ether, ethylene dichloride, benzene or other suitable defatting solvent.

The substantially completely defatted rice bran is then extracted with an antioxidant extracting solvent such as a lower alcohol, ketone, ester or aldehyde. The alcohols include methyl, ethyl, isopropyl, n-propyl, allyl, the butyl, amyl and hexyl alcohols and in fact, any alcohol or mixture of alcohols of six carbon atoms or lower may be used. Aliphatic ketones of six carbon atoms or lower such as acetone, ethyl methyl ketone, diethyl ketone, ethyl isopropyl ketone or methyl vinyl ketone are likewise useful. Aldehydes and esters of six carbon atoms, as for example acetaldehyde, propionaldehyde, butyraldehyde or crotonic aldehyde as well as methyl formate, ethyl acetate, propyl acetate, or vinyl acetate can be used. The preferred solvents, however, are methanol, ethanol or isopropanol and of these, methanol has been found particularly satisfactory. It is to be understood, however, that any aliphatic alcohol, ketone, ester or aldehyde of six carbon atoms or lower, either alone or in admixture can be used with satisfactory results.

The antioxidant extracting solvent is best used at high concentrations ranging from 98% solvent or higher, with the remainder water. While lower concentrations from 50% upward may be used for the extraction, the higher water content results in also extracting together with the desired antioxidant material such undesired material as water-soluble dextrins, sugars and carbohydrate matter which must eventually be removed. Moreover, large amounts of water must be avoided since in the following step the alkali or alkaline earth metal salts of the antioxidants obtained by alkaline reaction are somewhat soluble in water and thus cannot be fully recovered.

The solvent extract is then distilled to remove substantially all of the solvent and the extract, containing only a small amount of solvent, is treated with an alkaline or alkaline earth material such as sodium hydroxide, sodium methoxide, ethoxide or propoxide, or the corresponding potassium, lithium, barium or strontium compounds, in order to form alkali or alkaline earth metal salts of the desired antioxidant. The addition of alkaline material is regulated so that the solution is definitely alkaline in reaction. It has been found that best results are obtained when the pH of solution exceeds 10. The alkali or alkaline earth metal salts are then collected, acidified and extracted with ether, chloroform or any suitable water-immiscible solvent. The acidification may be carried out with any suitable mineral acid such as hydrochloric acid, sulfuric acid, phosphoric acid, etc., and sufficient acid is added until the solution definitely shows a pH in the acid range.

In order to obtain a more highly purified product, the solvent extract obtained after the defatting step may be distilled to dryness. This extract has been found to have fair antioxidant potency. The residue is now extracted with a small amount of a solvent such as that used for extracting the defatted rice bran. The preferred solvent here is methanol or ethanol. Again it is best to use highly concentrated solvents to avoid loss of valuable material at the later stages. The solvent extract is now cooled to room temperature or below, with a temperature of about 0° C. preferred, in order to separate an insoluble fraction which has been found to comprise carbohydrates and other inert matter. The insoluble fraction is discarded and the solution is then treated with the alkaline material as described above.

In order to illustrate the invention in greater detail, the following example is given although it is to be understood that the invention is not to be considered as limited to the specific materials or details disclosed therein.

Starting with 11 pounds of powdered rice bran, the material was placed in a conical percolator and extracted with petroleum ether (B. P. 40–60° C.) in order to remove as much fat as possible. This ether extract had no significant antioxidant action. The fatty matter removed amounted to 715 grams.

The defatted powdered rice bran was then extracted with 98% methanol by percolation. The methanol solution was concentrated to a syrupy consistency by distillation in vacuo under an atmosphere of nitrogen. The distillation was continued until substantially all of methanol had been removed. The syrupy residue was an effective antioxidant at a 4–5% level as shown by Table I.

*Table I*

| Antioxidant | Amount | Iodine Number | | | |
|---|---|---|---|---|---|
| | | 1 week | 2 weeks | 3 weeks | 4 weeks |
| 1. Blank | | 52 | 35 | | |
| 2. Methanol Extract | 50 mg. (0.4%) | 43 | 37 | | |
| 3. Methanol Extract | 100 mg. (0.8%) | 43 | 38 | | |
| 4. Methanol Extract | 500 mg. (4%) | 123 | 98 | 60 | 51 |
| 5. Methanol Extract | 1,004 mg. (8%) | 120 | 119 | 131 | 121 |

The syrupy, methanolic extract was dissolved in one liter of absolute ethanol and cooled to 0° C. an insoluble, syrupy material amounting to 170 grams was removed from which sucrose was isolated. This insoluble syrupy material was found to be entirely devoid of antioxidant activity.

The ethanolic fraction was treated with sodium ethoxide until the pH reached 11. The sodium salts were isolated from the liquor. The latter was tested and showed no antioxidant action.

The sodium salts were dissolved in water and concentrated. Hydrochloric acid was added until the pH was reduced to 5. The mixture was extracted continuously with diethyl ether. The ether extract was distilled to remove the ether and the residue was tested and found to be a potent antioxidant at the .2%–1.5% level as shown by Table II.

*Table II*

| Antioxidant | Amount | Iodine Number | | | |
|---|---|---|---|---|---|
| | | 1 week | 2 weeks | 3 weeks | 4 weeks |
| 1. Blank | | 42 | | | |
| 2. Oil from sodium salt | 25 mg. (0.2%) | 105 | 113 | 41 | 41 |
| 3. Oil from sodium salt | 50 mg. (0.4%) | 97 | 120 | 114 | 115 |
| 4. Oil from sodium salt | 100 mg. (0.8%) | 101 | 126 | 118 | 113 |
| 5. Oil from sodium salt | 180 mg. (1.5%) | 91 | 124 | 113 | 109 |

In testing a material for antioxidant value the following method is carried out.

Two grams of purified linoleic acid (iodine number greater than 160) is triturated with 10 grams of corn starch. The material to be tested is thoroughly mixed with this oil-starch mixture and circulated at 37° C. At appropriate intervals 2.5 gram aliquots are extracted with 100 ml. of chloroform. The chlorofrom extract is divided up into three 25 ml. portions. One is evaporated to dryness on a steam bath in order to ascertain total solids. The remaining two are treated with excess 2 N. Hanus solution. After one hour, the excess iodine-bromide is back titrated with 2 N. sodium thiosulfate, using 10% potassium iodide to make the halides water soluble. The iodine number is calculated. A blank is always prepared with each experiment. The antioxidant efficacy of a substance is measured by its ability to maintain the iodine number of linoleic acid for prolonged periods at 37° C.

An advantage of the above disclosed process is that after the antioxidant is removed from the rice bran the latter can be used for obtaining vitamins therefrom or for any purpose desired. A further advantage is that the product resulting from the process is non-toxic and hence is especially useful in retarding oxidative deterioration of foods and medicinals.

We claim:

1. The process of preparing an antioxidant from rice bran, consisting essentially of defatting the rice bran with a solvent of the group consisting of hydrocarbons and chlorinated hydrocarbons, extracting the defatted material with a water-soluble, lower aliphatic solvent having 1 to 6 carbon atoms in the molecule, alkalizing the extract obtained by the addition to said extract of an alkaline compound of the group consisting of alkali metal and alkaline earth metal compounds, separating the antioxidant salts formed, acidifying to an acid reaction, extracting the acidified liquid with a water-immiscible organic solvent in which said antioxidant is soluble, and removing the solvent from the extract to obtain the desired antioxidant in a substantially pure form.

2. The process of claim 1; wherein the lower aliphatic solvent is methanol.

3. The process of preparing an antioxidant from rice bran, consisting essentially of defatting rice bran with a solvent of the group consisting of hydrocarbons and chlorinated hydrocarbons, extracting the defatted bran with a water soluble, lower aliphatic solvent substantially free of water and having 1 to 6 carbon atoms in the molecule to obtain the desired antioxidant, adding an alkaline compound of the group consisting of alkali metal and alkaline earth metal compounds, separating the antioxidant from the extract in the form of a metal salt of the group consisting of alkali metal and alkaline earth metal salts, acidifying said salt, extracting the acidified mixture with a water-immiscible organic solvent in which the desired antioxidant is soluble and finally removing the solvent from the extract to obtain the desired antioxidant.

4. The process of preparing an antioxidant from rice bran, consisting essentially of defatting the rice bran with a solvent of the group consisting of hydrocarbons and chlorinated hydrocarbons, extracting the defatted material with a water-soluble, lower aliphatic solvent having 1 to 6 carbon atoms in the molecule, adding to said extract an alkaline compound of the group consisting of alkali metal and alkaline earth metal compounds, separating the antioxidant from the extract in the form of a metal salt of the group consisting of alkali metal and alkaline earth metal salts, isolating said salt, forming a concentrated aqueous solution of said salt, acidifying the latter to an acid reaction, extracting the acidified liquid with a water-immiscible organic solvent in which said antioxidant is soluble and removing the solvent from the extract to obtain the desired antioxidant in a substantially pure form.

5. The process of claim 1, wherein the water immiscible organic solvent is diethyl ether.

6. The process of preparing an antioxidant from rice bran, consisting essentially of defatting rice bran with a solvent of the group consisting of hydrocarbons and chlorinated hydrocarbons, extracting the defatted material with a water-soluble lower aliphatic solvent having 1 to 6 carbon atoms in the molecule, adding sodium ethoxide to said extract, separating the sodium salt of said antioxidant from the extract, forming a concentrated solution of said salt, acidifying said solution to an acid reaction, extracting the acidified solution with diethyl ether and finally removing the diethyl ether from the extract to obtain the desired antioxidant.

C. I. JAROWSKI.
ERIC T. STILLER.
MARTIN B. WILLIAMSON.

REFERENCES CITED

The following references are of record in the file of this patent:

UNITED STATES PATENTS

| Number | Name | Date |
|---|---|---|
| 2,098,254 | Mattill et al. | Nov. 9, 1937 |
| 2,176,034 | Musher | Oct. 10, 1939 |
| 2,176,038 | Musher | Oct. 10, 1939 |
| 2,181,765 | Musher | Nov. 28, 1939 |
| 2,188,319 | Siemers | Jan. 30, 1940 |
| 2,345,578 | Buxton | Apr. 4, 1944 |
| 2,380,546 | Patterson et al. | July 31, 1945 |